United States Patent
Cohen et al.

(10) Patent No.: US 6,377,983 B1
(45) Date of Patent: Apr. 23, 2002

(54) METHOD AND SYSTEM FOR CONVERTING EXPERTISE BASED ON DOCUMENT USAGE

(75) Inventors: Andrew L. Cohen, Brookline, MA (US); Paul P. Maglio, Santa Cruz; Robert C. Barrett, Sunnyvale, both of CA (US); Mark A. Sheldon, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/192,047

(22) Filed: Nov. 13, 1998

Related U.S. Application Data

(60) Provisional application No. 60/098,568, filed on Aug. 31, 1998.

(51) Int. Cl.[7] .............................................. G06F 15/16
(52) U.S. Cl. ..................... 709/217; 709/219; 709/209; 709/223; 707/4; 701/1
(58) Field of Search ................................ 709/217, 219, 709/209, 223, 249, 200, 203, 201; 707/4; 701/1

(56) References Cited

U.S. PATENT DOCUMENTS

| | | |
|---|---|---|
| 5,530,852 A | 6/1996 | Meske, Jr. et al. |
| 5,708,806 A | 1/1998 | DeRose et al. |
| 5,781,785 A | 7/1998 | Rowe et al. |
| 5,784,568 A | 7/1998 | Needham |
| 5,787,274 A | 7/1998 | Agrawal et al. |
| 5,793,365 A | 8/1998 | Tang et al. |
| 5,796,393 A | 8/1998 | MacNaughton et al. |
| 5,813,007 A | 9/1998 | Nielsen |
| 5,815,830 A | 9/1998 | Anthony |
| 5,819,258 A | 10/1998 | Vaithyanathan et al. |
| 5,857,179 A | 1/1999 | Vaithyanathan et al. |
| 5,911,140 A | 6/1999 | Tukey et al. |
| 5,918,237 A | 6/1999 | Montalbano |
| 5,923,845 A * | 7/1999 | Kamiya et al. .......... 379/93.15 |
| 5,951,641 A * | 9/1999 | Menard et al. ............. 709/217 |
| 5,956,509 A | 9/1999 | Kevner |
| 5,987,503 A | 11/1999 | Murakami |
| 6,014,136 A | 1/2000 | Ogasawara et al. |

(List continued on next page.)

OTHER PUBLICATIONS

Allerton 96, Bruce L. Lambert, Content Analysis Via Document Clustering, http://edfu.lis.uiuc.edu/allerton/96/lambert.html, 1 page.

(List continued on next page.)

*Primary Examiner*—Ayaz Sheikh
*Assistant Examiner*—Firmin Backer
(74) *Attorney, Agent, or Firm*—Brown Raysman Millstein Felder & Steiner LLP

(57) ABSTRACT

The invention disclosed herein relates to cooperative computing environments and information retrieval and management methods and systems. More particularly, the present invention relates to methods and systems for capturing and generating useful information about a user's access and use of data on a computer system, such as in the form of documents stored on remote servers, and making such useful information available to others. Documents on the computer system are accessible through a plurality of different methods, such as by specifying an identifier or locator for the document, activating a hyperlink in another document which points to the document, or navigating to the document through navigational commands in an application program such as a browser. The method involves capturing information regarding each of the accessed documents in the set, the information including the method used to access the document, dividing the set of documents into subsets of documents based at least in part on the methods used to access the documents, labeling each subset of documents with a topic, and making the labels and documents accessed available to other users who wish to browse the same documents.

49 Claims, 8 Drawing Sheets

U.S. PATENT DOCUMENTS

| | | | | |
|---|---|---|---|---|
| 6,021,432 A | * | 2/2000 | Sizer, II et al. | 709/217 |
| 6,055,560 A | * | 4/2000 | Mills et al. | 709/200 |
| 6,125,388 A | * | 9/2000 | Reisman | |
| 6,163,803 A | * | 12/2000 | Watanabe | 709/217 |
| 6,195,696 B1 | * | 2/2001 | Berber et al. | 709/223 |

OTHER PUBLICATIONS

Three–Automatic Classification, http://www.dcs.gla.ac.uk/Keith/Chapter.3/Ch.3.html, 24 pgs.

Almaden Research Center, http://www.almaden.ibm.com, 1 page.

Importance and Centroid Sampling, http://www.anu.edu.au/Forestry/mensuration/importan.htm, Apr. 29, 1997, 3 pgs.

Fulcrum White Paper: Knowledge Acquisition and Management in the Knowledge–Based Economy, Mar. 1997, http://www.fulcrum.com/english/products/wpaper1.htm, 11 pgs.

Internet Parallel Computing Archive Mirror Sites, http://www.hensa.ac.uk/parallel/www/mirror–sites.html, 9 pgs.

New Release from the Linguistic Data Consortium and Celex, Corporate List Oct. 1995 to present, http://nora.h-d.uib.nocorpora/1995–4/0124.html, 6 pgs.

Http://www.cs.dartmouth.edu/reports/abstracts/TR97–318/TR97–318.bibte, Abstract, 1 page.

Bruce L. Lambert, The Theme Machine: Theoretical Foundation and Summary of Methods, University of Illinois at Chicago, 23 pgs.

A System Architecture of Intelligent–Guided Browsing on the Web, Hsiangchu Lai, Tzyy–Ching Yang Department of Information Management National Sun Yat–sen University, Taiwan, R.O.C., 1998 IEEE, 11 pages.

* cited by examiner

METHOD AND SYSTEM FOR CONVERTING EXPERTISE BASED ON DOCUMENT USAGE

RELATED APPLICATIONS

This application is related to and claims the benefit of provisional application serial No. 60/098,568, titled THE EXPERTISE BROWSER: HOW TO LEVERAGE DISTRIBUTED ORGANIZATIONAL KNOWLEDGE, filed Aug. 31, 1998, which is hereby incorporated by reference into this application.

This application is related to commonly owned application Ser. No. 09/143,075, titled METHOD AND SYSTEM FOR INFORMING USERS OF SUBJECTS OF DISCUSSION IN ON-LINE CHATS, filed Aug. 28, 1998, which is hereby incorporated by reference into this application.

This application is related to commonly owned application Ser. No. 09/191,587, titled METHOD AND SYSTEM FOR SUMMARIZING TOPICS OF DOCUMENTS BROWSED BY A USER, filed Nov. 13, 1998, which is hereby incorporated by reference into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to cooperative computing environments and information retrieval and management methods and systems. More particularly, the present invention relates to methods and systems for capturing and generating useful information about a user's access and use of data on a computer system, such as in the form of documents stored on remote servers, and making such useful information available to others.

Computer systems such as organizational networks, database systems and the Internet, provide a wealth of information to users. However, users must know how to find the information they want. Indeed, searching for specific information on a desired subject of interest is often a difficult and tedious process that is usually aided by the user's existing knowledge of or expertise in the subject. This is particularly true in the relatively unstructured environment of the Internet.

Using the world wide web, for example, a user might begin a search for desired information by entering a keyword query through a search engine, and then follow hyperlinks contained in the web documents to move from one document to another until the desired information is found. Since keyword searches are typically unreliable and do not immediately produce directly relevant results, users are often required to browse through a number of documents until some directly relevant information is found. Expertise in a subject usually helps users formulate better keyword searches and recognize the relevance of the various results found.

Moreover, particular documents usually provide only part of the specific information desired, and thus users must often access a number of such documents until a complete set of useful information is compiled from the various documents. During this process, users also make frequent use of navigational commands offered by the user's web browser program, such as the BACK and FORWARD commands and the history or GO list to view documents previously accessed, and the HOME command to navigate to a home page in relation to a particular page found.

If the desired information is not found after a while, the user frequently restarts the search process by jumping to a new, unrelated resource such as the original or another search engine, an index file, or a known document which may have helped the user in the past in related searches. This jump is usually performed by manual entry of the address of the new resource, such as the uniform resource locator (URL) in the case of the web. Alternatively, if the user previously visited the resource and stored its URL as a bookmark on the browser, the user can jump to the new resource by selecting the bookmark. Of course, the user may get distracted during the search process by a hyperlink to another document which is completely unrelated to the search, or the user may select an active advertisement to pursue other information before returning to the thread of the search.

Thus, by the time a user finds a number of documents which contain the desired information, the search process has likely led the user through a path of numerous documents accessed in many different ways depending upon the user's judgment as to which way would bring the user closer to the desired end result.

Having now expended time and effort to compile this useful set of documents, the user is apt to want to capture this set both for the user's own later use as well as for use by others. Several software programs allow users to store a path of a series of documents as the user browses the documents. However, this path will likely include a number of documents which are unrelated to the search process or are otherwise unhelpful, as explained above. Those programs that allow users to edit their paths still require substantial manual effort and judgment on the part of the user. Moreover, other users have no way of finding paths or sequences of documents which relate to specific topics or which were created by specific users or by users with specific areas of expertise. Later users thus can not take advantage of the time and expertise of the first user in performing the search and browsing through numerous documents to find those that are truly relevant and helpful.

There is therefore a need for powerful tools and methods that capture a user's browsing history and automatically generate a set of useful documents and resources from this history for the user's later use as well as use by others.

SUMMARY OF THE INVENTION

It is an object of the present invention to solve the problems described above with existing document browsing systems.

It is another object of the present invention to allow a broad range of users to obtain the benefit of the expertise of experts as expressed through the experts' access and use of documents.

It is another object of the present invention to automatically parse document browser trails or paths into sequences of documents which are related by a common topic.

It is another object of the present invention to facilitate the use of the distributed expertise within an organization by making available traces of experts' browsing and searching behavior.

It is another object of the present invention to help users find documents that someone with expertise in a particular field has already read.

It is another object of the present invention to account for a user's method of accessing documents in determining how to group together sets of related documents.

Some of the above and other objects are achieved by a method and system for conveying expertise of a first user of a computer system to one or more second users of the computer system. The computer system stores a plurality of documents usable by the first and second users. The system may be a single computer, such as a personal computer accessible by a number of users, or may be a network of computers arranged in a client/server or related architecture. In a network environment, the documents would be stored on a server and usable by the first and second users through requests for the documents from individual client computers.

The method involves capturing information regarding a sequence of documents used by the first user on the computer system and associating a plurality of content areas with a plurality of sets of documents in the sequence based on the captured information. The second user is then allowed to select one of the content areas, and the set of documents associated with the selected content area is provided to the second user, possibly in the same sequence in which the documents were browsed by the first user.

The first user's information may be captured by monitoring the first user's activities and storing the desired information in a log file. The desired information includes an identifier of each document, such as a URL in the case of the Web, or database names and fields in the case of documents stored in server databases such as in the LOTUS NOTES↓ groupware system available from Lotus Development Corporation of Cambridge, Mass. In some embodiments, the desired information which is captured for each document also includes the method by which the document was accessed by the first user, e.g., by direct entry of the identifier such as the URL, selection of a stored bookmark, activation of a hyperlink from a prior document or from an external application such as electronic mail, or by navigation to the document through browser commands. The particular method used to access the document may then be considered in the decision process involved in parsing the entire document browse sequence into subsequences or clusters, on the theory that the method used to access the document reflects the first user's intention to continue along the same content trail, such as by activating a hyperlink, or to begin a new trail such as by selecting a stored bookmark.

In some embodiments, the method is implemented in one or more software programs stored on one or more computer readable media, such as magnetic or optical data storage devices, and executing on one or more computers to thereby cause the computers to perform the method. When used in a network environment, the method may be performed by two or more distinct computer programs residing on separate computers. For example, the step of capturing information regarding the first user's activities may be performed by a program residing on a client computer used by the first user, while the step of allowing second users to select a content area or label may be performed by a second program executing on a server centrally accessible by the first and second users.

In one embodiment, the method involves storing the information-browsing paths and patterns of content experts, and then using paths and patterns to help others who are browsing or searching in similar areas. More precisely, a browse path is the trail of documents opened or any other informational resources used to locate, view, navigate, or create documents, including queries and results. The system provides three ways to leverage expert browse paths:

1. If the second user knows a particular person with relevant expertise, the second user can explicitly specify that the system should provide access to that person's browse paths that are relevant to the query.
2. The second user can ask for the system to identify a ranked list of those with knowledge that appears relevant to current information needs and proceed as in (1).
3. The second user can ask the system to return browse paths of all experts relevant to a specific query, sorted by expert. The user can then either follow a particular expert's paths or can browse all of the paths.

Some of the above and other objects are achieved by a method for conveying expertise of a plurality of first users of a computer system to one or more second users of the computer system, the computer system storing a plurality of documents usable by the first and second users. The method involves capturing information regarding a sequence of documents used by each of the first users on the computer system, storing the captured information regarding each sequence of documents in association with the first user, allowing a second user to select one of the first users, and providing the sequence of documents associated with a selected first user to the second user.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

The preferred embodiments of a system, method, and article of manufacture containing software programs in accordance with the present invention is described with reference to the drawings in FIGS. 1–7.

Figure 1:
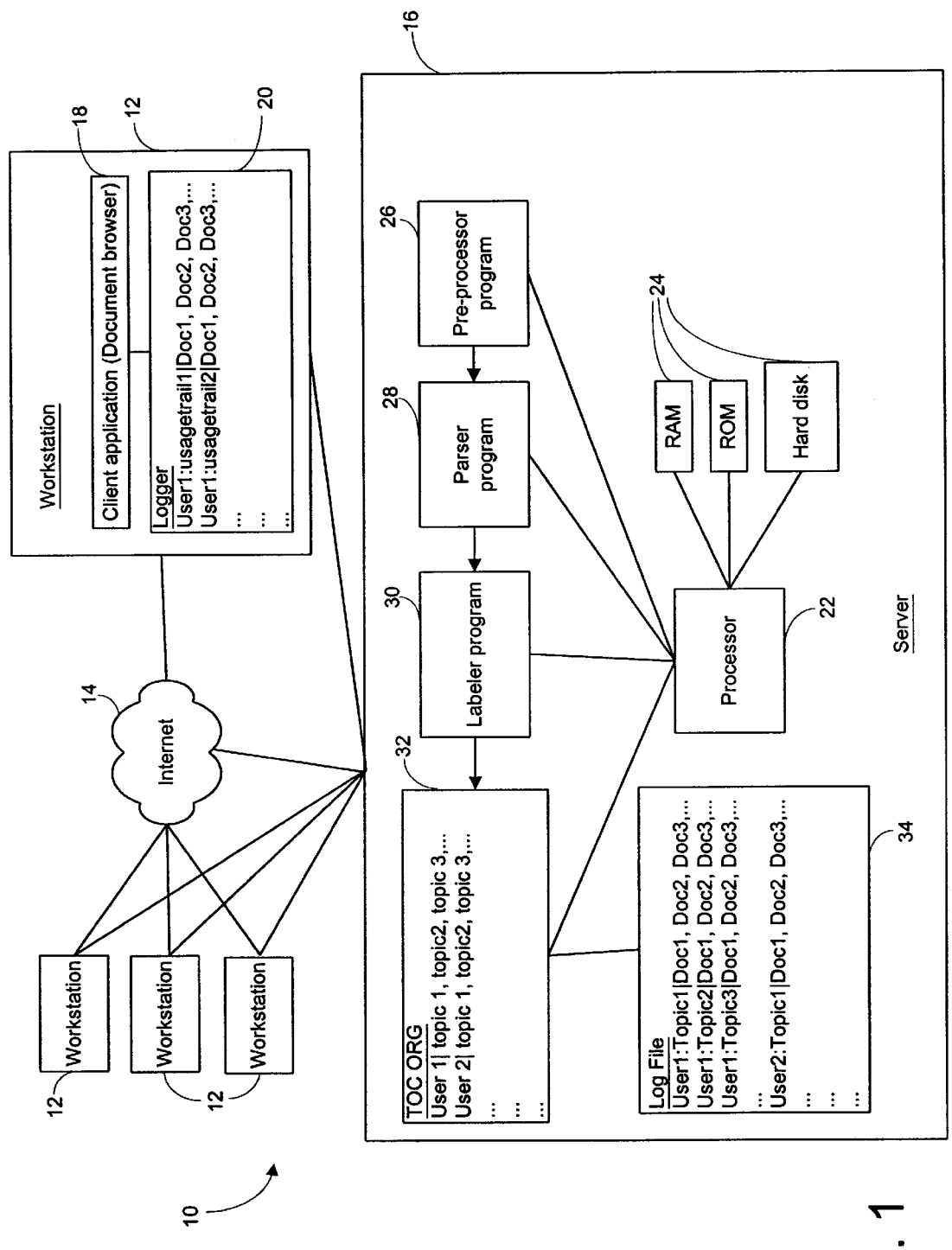
FIG. 1 is a diagram of a system for capturing and conveying expertise in document usage in accordance with one embodiment of the present invention.

Referring to FIG. 1, one embodiment of the system 10 of the present invention includes a plurality of computer workstations 12 connected to a network 14, such as the Internet or other internet or intranet, and a monitoring server 16 connectable to the workstations 12 directly or over the Internet 14. As shown in one exemplary case in FIG. 1, the workstations 12 20 have a client application program 18 executing thereon which is capable of accessing, retrieving and using documents available from servers on the Internet 14, from the monitoring server 16, or from other workstations 12. In the case of the world wide web, the client application 18 is a web browser program such as NETSCAPE NAVIGATOR or INTERNET EXPLORER which communicates with the servers on the web via HTTP. Alternatively, the client application 18 may be a LOTUS NOTES client application which communicates and exchanges data with LOTUS NOTES databases operating on the servers. As one skilled in the art will recognize, many conventional client applications for network environments may be used without departing from the scope of the present invention.

In particular embodiments, the workstations 12 also have a logger program 20 operating thereon which logs the documents accessed and used by the client application 18 and stores this logged or captured information in a log file. The logger program 20 may be built into the client application 18, or may be a plug-in program or operating system-dependent program that spies on low level system events, such as a DDE, as known to those of skill in the art.

Alternatively, the logger program 20 is a programmable intermediary which is programmed to monitor the use of the client application. An example of such an intermediary is web browser intelligence or WBI client as described in Barrett, R., Maglio, P. P., & Kellem, D. C. *How to Personalize the Web*, Proceedings of Human Factors in Computing Systems, CHI '97. (1997), New York: ACM Press, and Barrett, R. & Maglio, P. P., *Intermediaries: New places for producing and manipulating web content*, Proceedings of Seventh International World Wide Web Conference. Brisbane, Australia, 1998, both of which are hereby incorporated by reference into this application, and are available for downloading on the web at http://www.alphaworks.ibm.com. These programmable intermediaries provide a convenient means for monitoring the sequence of URLs viewed by a user, as the system is platform-independent, thus allowing identical code to be used on any kind of computer.

The logger program 20 monitors the usage of documents retrieved by the client application 18 and stores document identifiers which identify the documents used. In the case of the web, the document identifiers are the URLs for the document or pseudonyms thereof. In the case of documents retrieved from a LOTUS NOTES database, the document identifiers are LOTUS NOTES Universal Identifiers (UIDs) which name any document in any database by encoding an identifier for the NOTES database, including possible replica information, and an identifier for the document within the database. The document identifiers for consecutive documents accessed in a sequence during a browsing session are added to the log. A usage trail of all the documents accessed or used by the user during a browsing session is thus created and stored in the log file. In some embodiments, described in greater detail below, additional information is captured by the logger, including the method used to access the particular document and actions taken by the user in the document, e.g., search terms input by the user into a search engine.

In the case with NOTES UIDs, the additional information comprises client action information, which identifies the method used to access particular documents and actions taken in LOTUS NOTES. Notes supports hyperlinks in the form of document links and database links which take the user to a particular database without picking a document. Users can change windows in Notes, open databases manually, which is the equivalent of typing in a URL, pick an icon, or bookmark, on the desktop, and perform other operations or actions. These actions are captured as additional information.

At the end of a document browsing session, such as at the end of a day or when the user terminates the client application 18, the usage trail is ended. Additional usage trails may be established in the log file if the user initiates another browsing session. Because trails are meant ultimately to be shared, they are stored in a central location to which all users or clients have access. Thus, at certain points, the log file is transmitted from the workstation 12 to the monitoring server. The monitoring server 16 contains conventional computer hardware elements including a processor 22 and memory devices 24 including a RAM, ROM, hard disk, and other magnetic or optical disk drives.

The monitoring server 16 further contains a number of program modules for analyzing the user's log. These program modules include a pre-processor 26, a parser 28, and a labeler 30. The pre-processor 26 prepares a usage trail for parsing, and the parser 28 breaks the trail into content areas in accordance with processes described herein. The labeler 30 assigns labels or topics to the content areas, which topics are then arranged in a table of contents 32 which associates the various topics with the users from whose usage trails they were derived. The list of documents associated with each topic is stored in the table of contents 32 or a separate relational table 34, so that they can be retrieved for presentation to other users as described herein.

In particular embodiments, this central repository is implemented as a WBI server connected to a simple database or file system. Thus, the client-side WBI monitors URLs viewed by a specific individual and sends that information via a simple HTTP request to a central WBI server which maintains a database of all users and their trails. As in the case of monitoring, WBI provides a convenient and platform-independent means for maintaining these data, but many other schemes are possible as will be recognized by those of skill in the art, such as a DB2 or LOTUS NOTES database, though these would require different client-server protocols.

Figure 2:
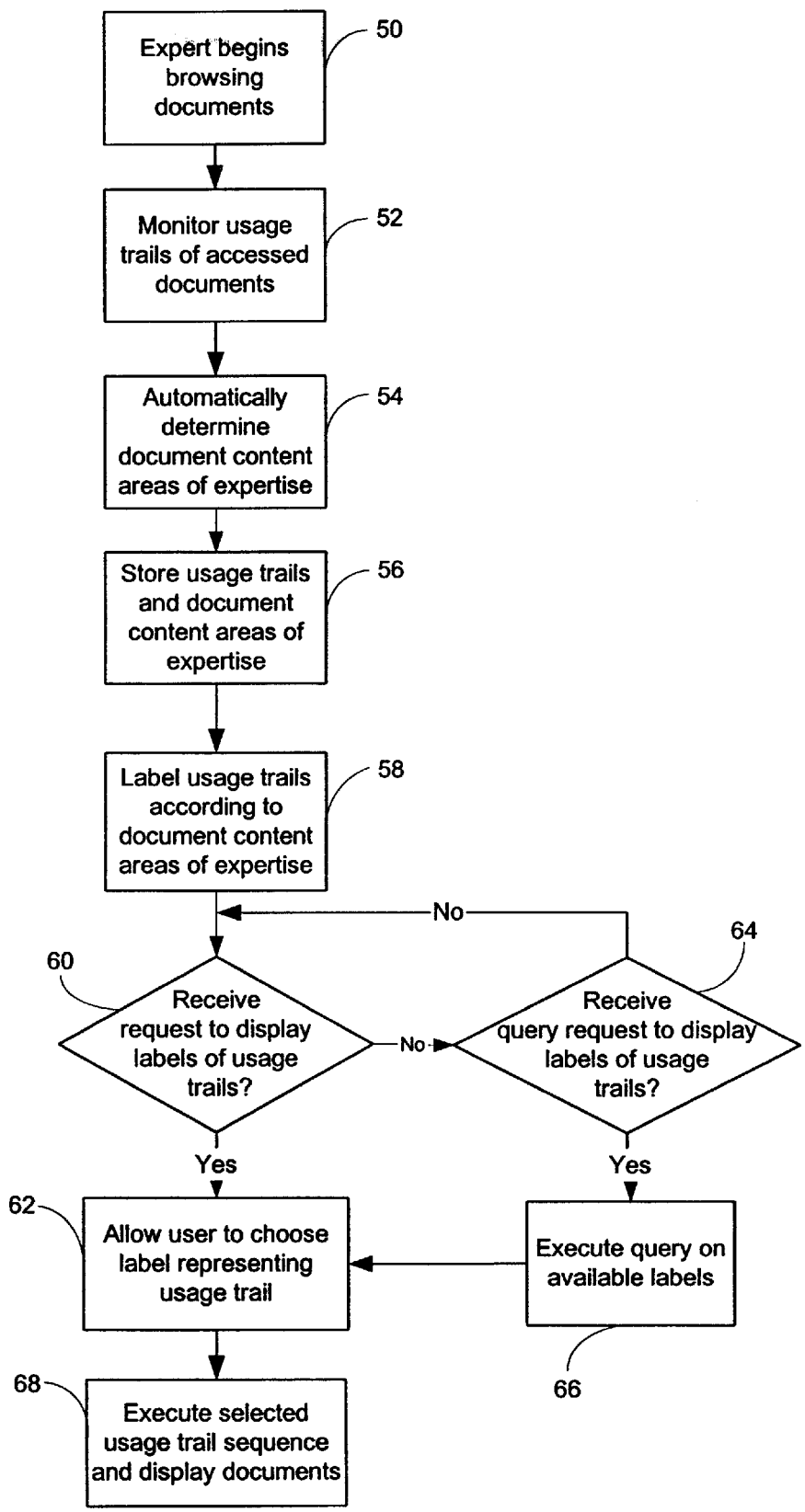
FIG. 2 is flow chart showing a process of capturing and conveying expertise in document usage using the system of FIG. I in accordance with one embodiment of the present invention.

Referring to FIG. 2, one process for sharing expertise using the system of FIG. 1 begins when an expert user is browsing through documents, step 50. The documents accessed by the expert are monitored and stored, step 52, to create a usage trail. The usage trail is analyzed to automatically determine one or more content areas of the documents, step 54, and the usage trails and content areas are stored, step 56. The process of determining the content areas effectively cuts the usage trail into content areas and associates the trails with people with expertise in that content area. Experts are persons with peer acknowledged familiarity with a particular content area or as defined by one of the many computer systems designed to track expertise in organizations. A variety of methods are possible for cutting or breaking the usage trail, including ones that take account of content or semantics of the documents on the trails, topology or connectivity of documents on the trails, or both, as described in the above reference 1998 article by Maglio & Barrett. A alternative method for meaningfully breaking trails into content areas based on local connections of trail elements is described in Maglio, P. P. & Barrett, R, *How to Build Modeling Agents to Support Web Searchers*, Proceedings of the Sixth International Conference on User Modeling, New York, 1997, which is hereby incorporated by reference into this application. Alternative processes for determining the content areas are described below with reference to FIGS. 5–7.

Once the usage trail is broken and content areas identified, the portions of the usage areas are labeled with topics, step 58. In a simple embodiment, labeling is performed by selecting the most frequent word or phrase to appear in the portion of the usage trail. Other embodiments of labeling are used with reference to clustering technology, as described below and otherwise known to those of skill in the art.

A subsequent user may access the labels in alternative ways. The user may simply request a list of all available labels or topics displayed, step 60, in response to which the list is retrieved from and displayed and the user allowed to select one of the labels, step 62. The user may place a query request for a subject matter of interest to the user, step 64, and the query is executed on the available labels in an attempt to find a reasonably close match, step 66. Labels 3330/38 which are possible matches to the query are displayed and the user may make a selection therefrom, step 62. Once the user selects a label, the portion or subsequence of the usage trail associated with the label is retrieved and the documents in the subsequence provided to the user, step 68, possibly in the same order in which the documents were accessed by the expert in the s original browsing session as recorded in the usage trail.

Figure 3:
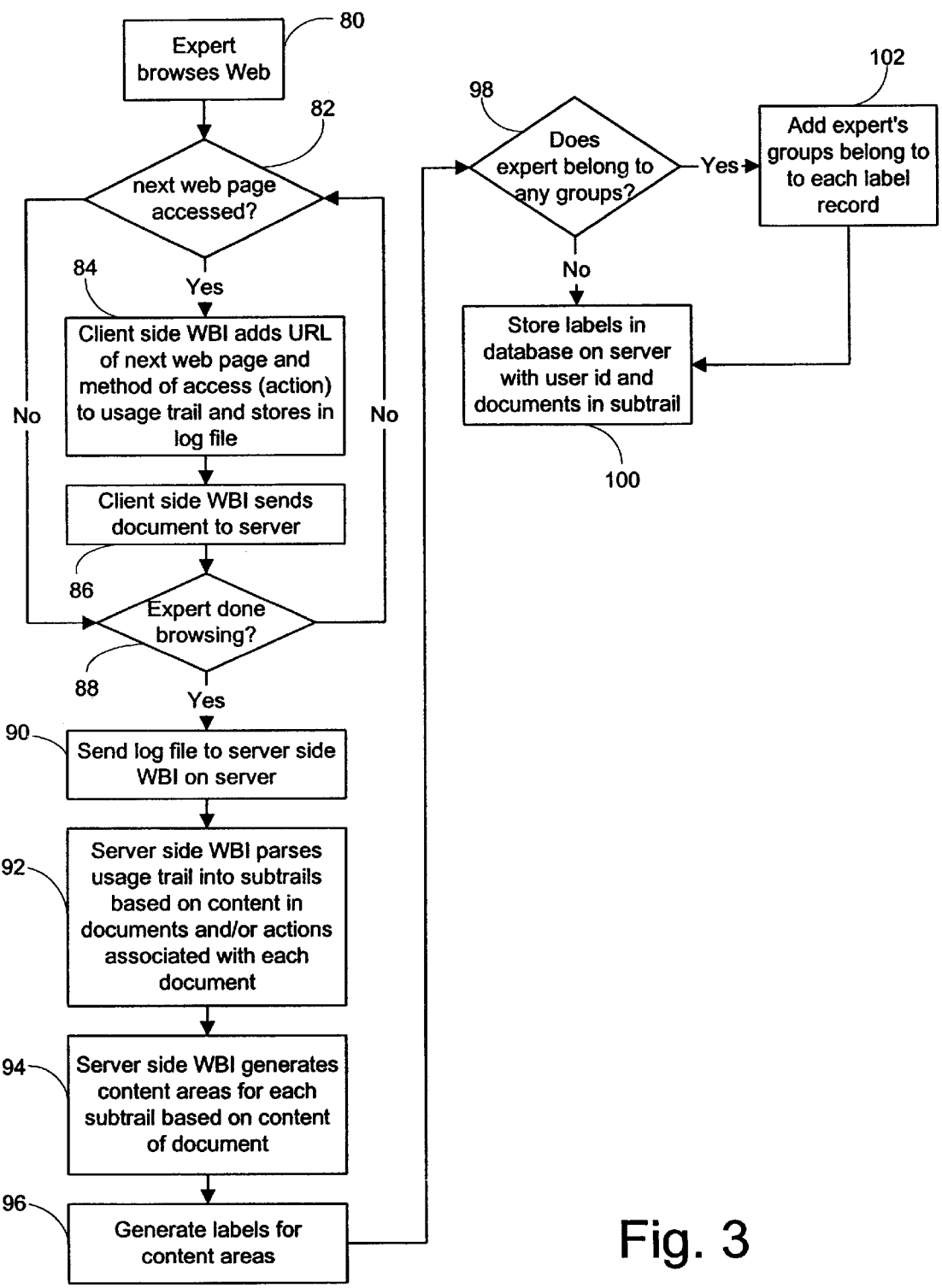
FIG. 3 is a flow chart showing a process of capturing and parsing an expert's use of documents on the world wide web in accordance with one embodiment of the present invention.
Figure 4:
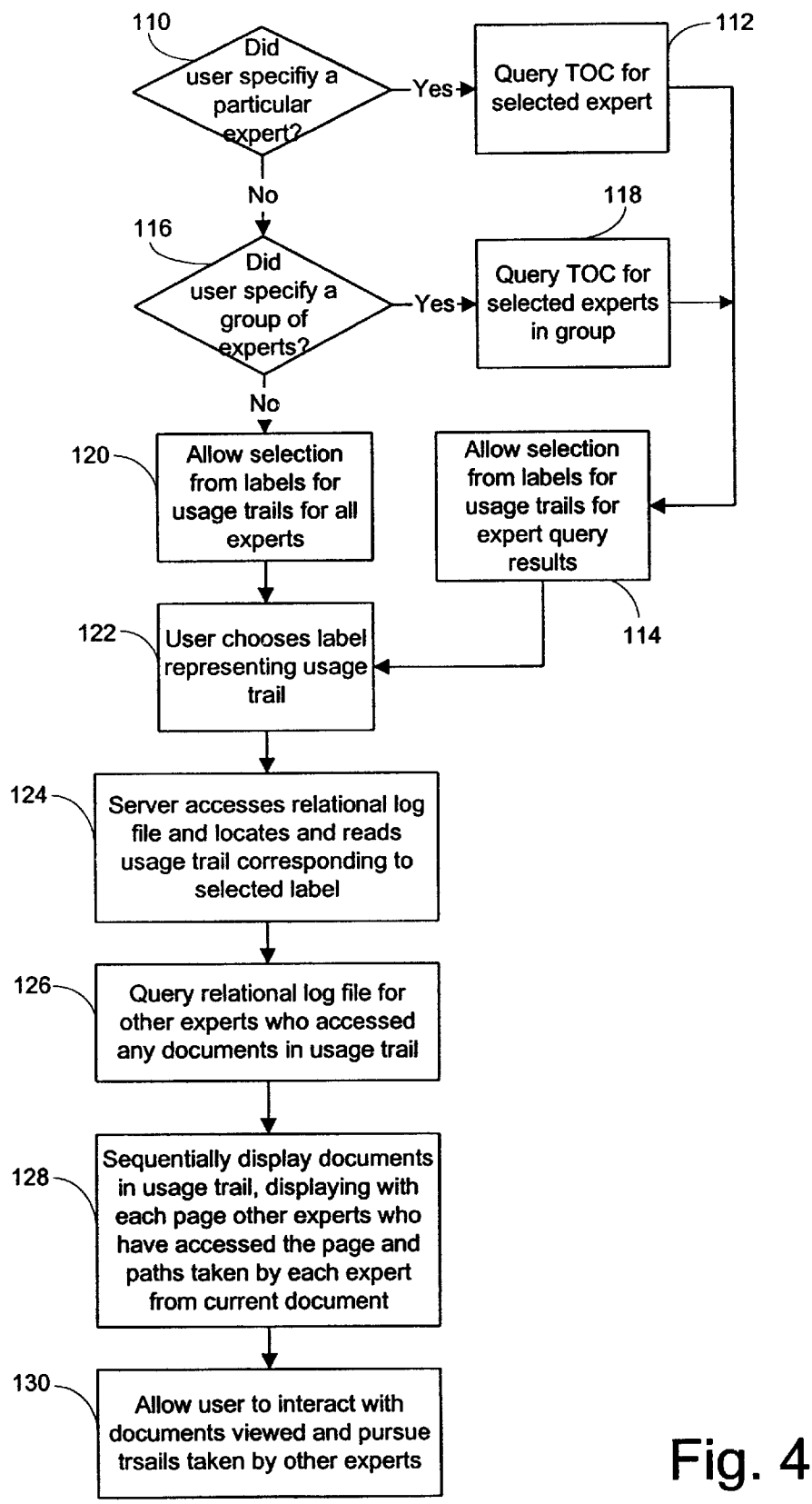
FIG. 4 is a flow chart showing a process of allowing users to search and access an expert's document sequences by specifying a topic and/or expert in accordance with one embodiment of the present invention.

Referring to FIGS. 3–4, the process of capturing expertise information and making it available to others is now described in greater detail with respect to the world wide web embodiment described above involving the use of WBI intermediaries on the client workstations and monitoring server. As shown in FIG. 3, as the expert browses the web, step 80, the WBI client checks when a new web page has been accessed, step 82. In this context, a new web page includes any change in web page, even to a web page the expert has previously accessed. When a new page is accessed, the client WBI agent adds the URL of the web page and the method used by the expert to access the web page into the sage trial stored in the log file, step 84. Alternatively, only new web pages not previously accessed can be added to the usage trail. The method of access used by the expert is stored in the log file for use in parsing the usage trail. The various methods of accessing web documents are well known, and include those set forth above such as input of a URL, selection of a bookmark, activation of a hyperlink from another document or another application, and browser navigation.

The client side WBI agent also sends the document to the monitoring server, step 86, for analysis of its content during parsing. Alternatively, the client side WBI agent can send the URL of each document to the monitoring server, which server then retrieves the document directly from its original server.

When the expert is done browsing, step 88, as determined by, e.g., termination of the browser program, or otherwise at scheduled times or events, the log file generated by the client side WBI agent and representing the captured information of expert activity is transmitted to the server side WBI, step 90. In alternative embodiments, the captured information is sent to the server as each new web page is accessed. The server side WBI agent parses the usage trail into subtrails or subsequences based on the captured information, step 92, which may include a combination of document content and user actions in accessing the document. The server WBI agent also generates content areas for each the subsequences, step 94, based upon the contents of the documents. Labels are generated for each content area, step 96.

If the expert does not belong to a group, step 98, the labels generated for the user's content areas are stored in a database on the server. If the expert belongs to a group such as a department within an organization, step 98, the group data is associated with the expert, step 102, and the expert, group and label data is stored in the database, step 100. The server may contain a table of groups and users for use in making this determination, of the expert's log file may contain data identifying which groups, if any, to which the expert belongs.

Referring to FIG. 4, a subsequent user has several options for finding document content areas for topics of interest. If the user knows the identity of an expert, the user can specify the expert, step 110, and the table of topics is queried for as explained above with reference to FIG. 2, the user can display the list of all topics for that expert and make a selection therefrom, step 114, or may input a query for topics and be presented a list of matching topics. If the user knows the group but not a particular expert, the user can specify the group, step 116, and the table of contents is queried for labels associated with the experts in that group, step 118. If the user does not know of any particular expert or group in the subject matter of interest to the user, the user can display the list of topics or perform a query, step 120, as described above.

Ultimately, the user chooses a label or topic which represents a trail of documents in the associated content area, step 122. In response, the server side WBI accesses the topic database to locate the trail of documents associated with the selected label, step 124. In addition, the server side WBI queries the database to determine whether other experts accessed documents in the located trail and other trails taken by such experts from the document, step 126. The server transmits the list of other experts, associated documents, and alternative trails to the client for sequential display. Alternatively, the server provides the list of URLs and other information to the client side WBI agent, which retrieves each of the documents in the trail in sequence, step 128. As a further alternative, the monitoring server retrieves the documents from the original server and transmit them to the client in sequence. The user is allowed to interact with each document provided, step 130, and to issue commands whether to proceed with the other documents in the trail or pursue another trail followed by one of the other identified experts.

The following exemplary series of scenarios assist in the understanding of the operation of the user selection options described herein. The exemplary situation is a financial consulting scenario.

Sara is a tax expert at a major financial consulting firm. She works in one of fifteen groups each consisting of ten tax consultants. Each group has a geographic specialty and each individual within each group has expertise in a particular area of tax law. Sara has a client who is a resident of Sweden, but who is a U.S. citizen. In addition, this client's family (husband and children) continues to live in San Francisco where they own residential and income property. Thus, she has to file personal income tax forms in both countries. However, Sara has joined the San Francisco group recently and she has not yet gained expertise in Swedish Tax law. She needs to leverage the expertise of her counterparts in the group who are specialists in Swedish and international tax law.

Scenario 1: When the User Knows the Identity of the Expert. Sara wants to know how to account for US rental property income on the Swedish income tax forms and remembers meeting Sven Jorgensen at a company meeting. She would like to capitalize on his expertise in this area. Sara performs the following steps:

Sara selects Sven, an the expert whose browsing paths she would like to query.

Sara begins to browse through his paths by typing in tentative query terms, such as "U.S. rental income". As she types in the query, relevant browse paths created by Sven appear on the screen.

Sara selects one of the paths and reviews the browse histories and documents until she finds the document that helps solve her problem.

Scenario 2: When the User Knows the Group. Sara wants to know how to account for U.S. rental property income on the Swedish income tax forms and vaguely remembers meeting a group of experts in US-Swedish tax law at a company meeting. Unfortunately, she does not remember any of their names. Sara needs to discover the experts in the area. She types in her query, which is performed on an indexed set of documents contained in the experts browse paths. What is returned is a set of experts and a sub-set of each expert's browse paths that match the query. She requests the list of content area experts.

From this list, Sara thinks she remembers Sven Jorgensen and Ben Hogan as the experts she met, and selects their paths as ones she would like to browse.

Sara begins to browse through these paths by typing in tentative queries such as "U.S. rental income". As she types in the queries, paths created by the experts that are related her query appear on the screen.

Sara selects one of the paths and reviews documents until she finds the document that helps solve her problem.

Scenario 3: When the User Needs to Identify an Expert. Sara wants to know how to account for U.S. rental property income on Swedish income tax forms. Unfortunately, she has no idea who in her company might know relevant information in this area.

Once again Sara needs to discover the experts in the area. She types in her query that is performed on an indexed set of documents contained in the experts' browse paths. What is returned is a set of experts and a sub-set of each expert's browse paths that match the query.

She requests the list of content area experts.

Sara does not recognize any of the experts, so she selects all of the experts. She scans through the paths. At first, none seem especially related to her interests. However, after reviewing them carefully, one of the experts' paths looks interesting.

She selects that expert and requests all of that person's paths. Sara finds one of the paths and accompanying document that helps solve her problem.

In the first two of the scenarios described above, Sara either knows an expert or a group of experts who can likely answer her questions. In these cases, she is able to leverage her tacit knowledge about people and their differential expertise in her organization. She can review traces of the documents people have read with a reasonable expectation of finding more useful documents than if she had browsed or searched alone. In the third scenario, Sara has no idea who in the organization might have the expertise to help her. In this case, the system of the present invention relies on explicit representations of expertise in the form of updated profiles and taxonomies of people and their respective expertise.

As explained above, the parsing of the usage trail may be accomplished in a number of known ways, depending upon the results desired. Other methodologies which provide improved results over known methods are now described with reference to FIGS. 5–7B. These parsing methodologies are applicable to the expertise sharing methodology described above. They are also generally applicable to parsing of a user's browsing history for the user's own use, for example, to create an index or table of contents of the user's own browsing activities so the user can retrace his steps. Thus, the parsing methodologies described below may be implemented in stand-alone programs residing and executing on the user's own computer rather than on a remotely located server.

Figure 5:
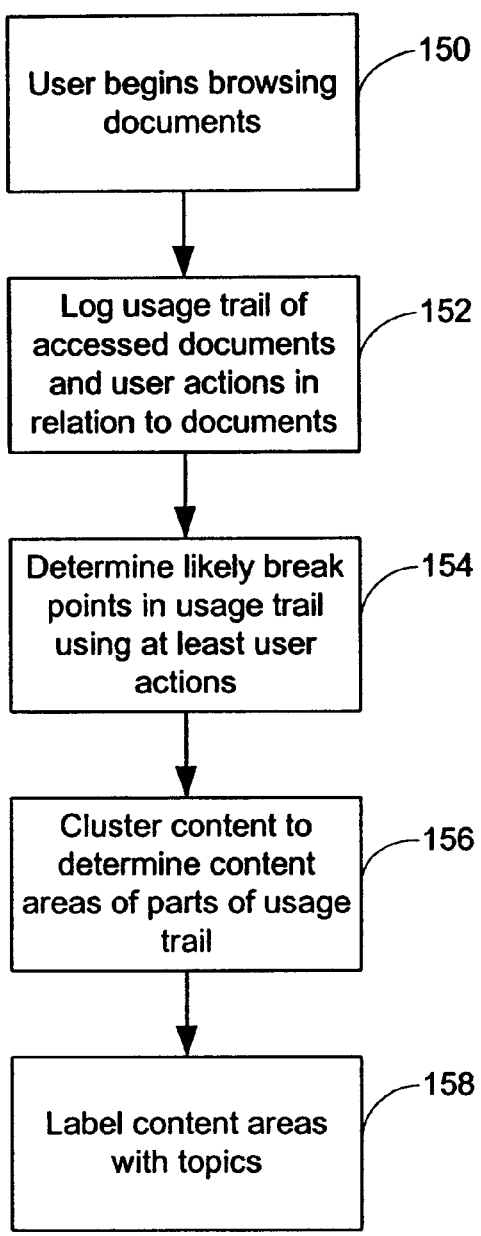
FIG. 5 is a flow chart showing a process of parsing a document usage trail in accordance with one embodiment of the present invention.

Referring to FIG. 5, the basic parsing method starts when the user browses through documents, step 150, and a usage trail is logged by capturing the document identifiers such as URLs as well as user actions made in connection with the documents, step 152. These user actions include the method employed to access the document as explained above, and may include other actions such as text input by the user while interacting with the document. The actions logged are used to help determine likely or definitive break points in the usage trail, step 154. Different heuristics may be applied to partition the usage trail based on the user actions, and examples are described below with reference to FIGS. 6 and 7A–7B.

Standard document clustering techniques are employed to determine content areas within the usage trail, step 156. The clustering techniques may be any clustering algorithm including conventional ones such as the k-means clustering algorithm described in L. Bottou and Y. Bengio, *Convergence Properties of the K-Means Algorithm, in Advances in Neural Information Processing Systems* 7, pages 585–592 (MIT Press 1995), which is hereby incorporated by reference into this application. Several examples of additional document clustering algorithms are described in the following two documents, which are hereby incorporated by reference into this application: Douglas R. Cutting, David R. Karger, Jan O. Pedersen, John W. Tukey, *Scatter/Gather: A Cluster-based Approach to Browsing Large Document Collections*. In Proceedings of the 15th Annual International ACM SIGIR Conference. Association for Computing Machinery. New York. June, 1992. Pages 318–329. Gerard Salton. *Introduction to Modern Information Retrieval*, (McGraw-Hill, New York 1983).

After clustering is completed, the content areas are labeled using standard labeling techniques, step 158. The labeling of document clusters is known to those of skill in the art, and is described for example in pages 314–323 of Peter G. Anick and Shivakumar Vaithyanathan, *Exploiting Clustering and Phrases for Context-based Information Retrieval*, in Proceedings of the 20th International ACM SIGIR Conference, Association for Computing Machinery, July 1997, which document is hereby incorporated by reference into this application. In the context of the world wide web, in hypertext documents, since there is more information than just the content of documents, documents can be clustered by content, or by analysis of their hyperlink structure, or both. Combining content and link information into a single clustering algorithm and purely content-based and purely link-based clustering is described in, for example "HyPursuit: A Hierarchical Network Search Engine that Exploits Content-Link Hypertext Clustering," Ron Weiss, Bienvenido Velez, Mark A. Sheldon, Chanathip Nemprempre, Peter Szilagyi, Andrzej Duda, and David K. Gifford, Proceedings of the Seventh ACM Conference on Hypertext, Washington, D.C., March 1996 which document is hereby incorporated by reference into this application.

Figure 6:
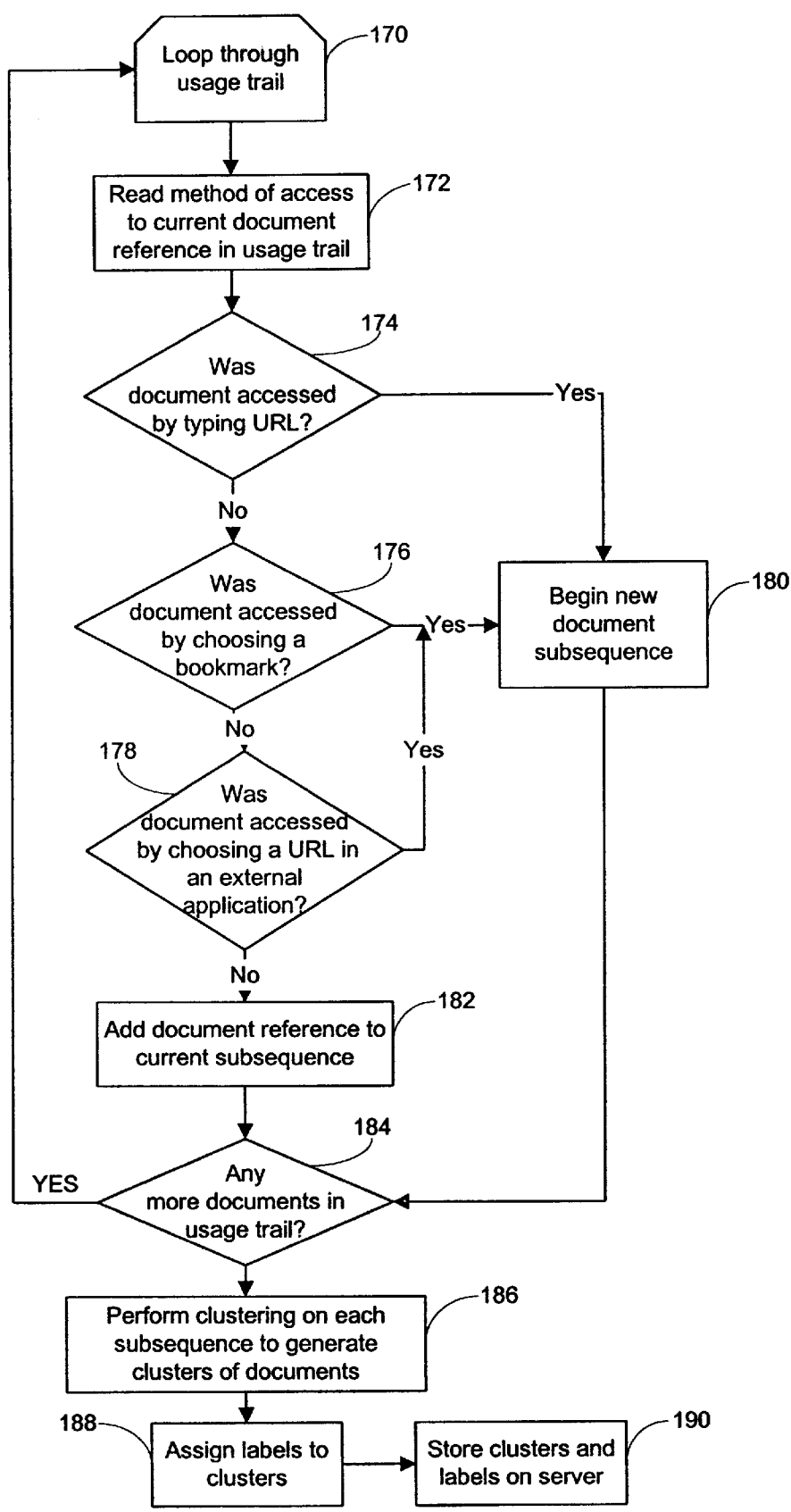
FIG. 6 is a flow chart showing the parsing process of FIG. 5 applying a first set of heuristics in accordance with one embodiment of the present invention.

FIG. 6 shows one embodiment of the parsing using the first heuristic. Under this heuristic, certain user actions are deemed to end a prior document sequence or trail and begin a new one. These actions may vary, but in the particular embodiment in FIG. 6 they include inputting a URL, selecting a bookmark or choosing a URL from an external application. In theory, these actions likely represent the user's intention to start a new thread or search, since the user is jumping to a seemingly unrelated document. Entering a new search term into a search engine for a new web-wide search may similarly be considered the start of a new trail. Conversely, other actions such as selecting hyperlinks or navigating using browser commands are deemed to likely represent a continuation of the ongoing thread of interest or search for information.

Thus, referring to FIG. 6, given a usage trail log which includes the user actions obtained as described above, the parsing program employing this method loops through the usage trail to consider each document, step 170, and reads the method of user access to each document as stored in the log, step 172. For each document, the parsing program tests if the document was accessed by direct input of a URL, step 174, selection of a bookmark, step 176, or activation of a link in an external application, step 178, and, if any of those apply, a new document sequence is established, step 180. Otherwise, the current document is added to the current open subsequence, step 182. If there are more documents in the usage trail, step 184, the process continues, until all documents have been considered and the usage trail is divided into a set of subsequences. The program then performs clustering on each subsequence to generate clusters of related documents, step 186. The clusters are labeled, step 188, and the labels and associated documents are stored for later reference, step 190.

The methodology shown in FIG. 6 provides for a clean, relatively simple and quick way to divide up a usage trail for clustering. However, it may also fail to include documents together in a cluster which are otherwise quite closely related in substance because of the circumstances in which they are accessed, e.g., because the second one happened to have been accessed by one type of user action rather than another. This possibility is accounted for in the alternative methodology shown in FIGS. 7A–7B by giving some weight to user actions in clustering, rather than simply dividing the trail at certain user actions.

Figure 7A:
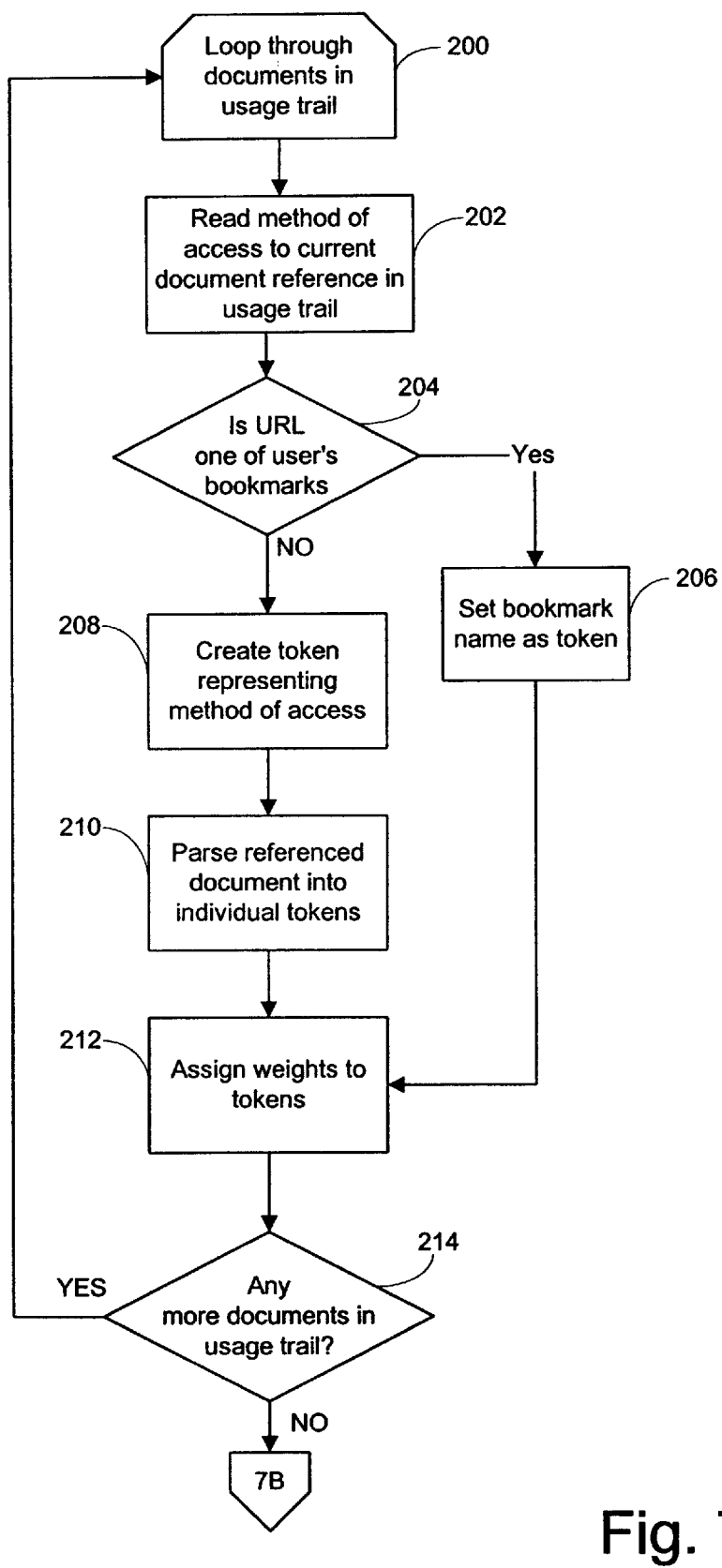
FIGS. 7A–7B contain a flow chart showing the parsing process of FIG. 5 applying a second set of heuristics in accordance with one embodiment of the present invention.

Beginning with FIG. 7A, given a usage trail log which includes the user actions obtained as described above, the parsing program employing this second method loops through the usage trail to consider each document, step 200, and reads the method of user access to each document as stored in the log, step 202. If the URL for the document is one of the user's bookmarks, the bookmark name is set as a token for clustering, step 206. Otherwise, a token is created representing the method of access, step 208. Creating the token comprises comparing the access method to a table of access methods which are set to suggest a topical break. If the table comparison suggest a topical break, then a new token is created which would not pass through the document parser, for example SuggestedClusterN, where N is the number of the current cluster. For every document encountered in the log until the next cluster break, the token, in this case SuggestedClusterN, is added to the cluster. The weight of the token is tuned to affect clustering as one skilled in the art would recognized.

In accordance with standard clustering techniques, the document itself is parsed into tokens, step 210, and weights are assigned to the tokens, step 212. This process is performed for all documents in the trail, step 218.

As an alternative to the logic illustrated in FIG. 7A, a new document sequence can be started upon specified actions taken by the expert, as well as creating tokens as illustrated in FIG. 7A.

Figure 7B:
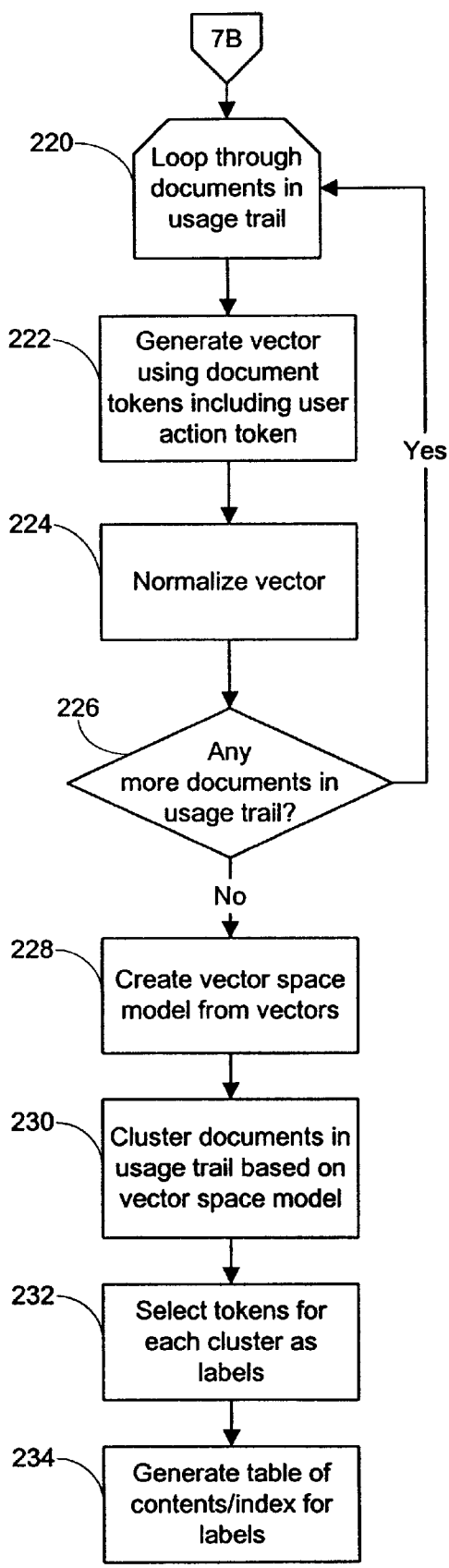

Referring to FIG. 7B, for each document in the trail, step 220, a vector is generated as a combination of all the tokens, including the user action tokens, step 222. The vector is normalized in accordance with standard linear algebra techniques, step 224. This process is performed on each document until vectors have been generated for all documents, step 226. A vector space model is created from the vectors, step 228, and the documents are clustered based on the vector space model, step 230. Tokens from each cluster are selected to serve as the labels, step 232, in accordance with standard labeling techniques, and a table of contents is generated from the labels, step 234.

As a result of this second method, documents which are very close in content will still be clustered together even when an abrupt user action occurred between them. Conversely, documents which are actually unrelated will not be clustered together just because one was accessed through activation of a hyperlink in the other.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for conveying expertise of a first user of a computer system to one or more second users of the computer system, the computer system storing a plurality of documents usable by the first and second users, the method comprising:

capturing information regarding a sequence of documents used by the first user on the computer system;

associating a plurality of content areas with a plurality of sets of documents in the sequence of documents used by the first user based on the captured information;

allowing a second user of the computer system to select one of the content areas; and providing the set of documents associated with a selected content area to the second user.

2. The method of claim 1, wherein the documents are each associated with an identifier, and wherein the step of capturing information comprises capturing the identifiers associated with the documents used.

3. The method of claim 1, wherein the documents contain content and the step of capturing information comprises capturing the content contained in the documents.

4. The method of claim 1, wherein the documents are accessible on the computer system by the first user through a plurality of different methods, and wherein the step of capturing information comprising capturing the method used by the first user to access each of the documents in the sequence.

5. The method of claim 1, wherein the step of associating the plurality of content areas comprises dividing the sequence of documents used by the first user into a plurality of subsequences of documents based on the captured information and associating a content area with each of the subsequences of documents.

6. The method of claim 5, wherein the step of associating the plurality of content areas comprises identifying a content area to associate with each subsequence based on the captured information.

7. The method of claim 1, wherein the step of allowing the second user to select one of the content areas comprises presenting the plurality of content areas to the user as a plurality of selectable choices.

8. The method of claim 1, wherein the step of allowing the second user to select one of the content areas comprises accepting a query from the second user about a desired subject and matching the queried subject with one of the plurality of content areas.

9. The method of claim 1, wherein the step of providing the set of documents associated with the selected content area to the second user comprises providing the documents in the set in the sequence in which the documents in the set were used by the first user.

10. The method of claim 1, wherein the computer system includes one or more servers storing the plurality of documents and one or more clients used by the first and second users, and wherein the step of capturing information regarding the sequence of documents used by the first user comprises monitoring the first user's use of the sequence of documents on a first client, transmitting information about the monitored use of the documents to a first server, and storing the transmitted information on the first server.

11. The method of claim 10, wherein the first server performs the step of associating the content areas with the sets of documents and performs the step of providing the set of documents to the second user in response to the selection of the content area by the second user using a second client.

12. The method of claim 10, wherein the computer system comprises a distributed computing environment in which documents are contained in one or more databases stored on the one or more servers, wherein each of the documents is identified by database location data, and wherein the step of transmitting information about the monitored use of the documents comprises transmitting the database location data identifying the documents.

13. The method of claim 10, wherein the computer system comprises at least part of the world wide web in which documents stored on one or more web servers are each identified by a URL, and wherein the step of transmitting information about the monitored use of the documents comprises transmitting the URLs identifying the documents.

14. The method of claim 13, wherein the documents are accessible on the computer system by the first user through a plurality of different methods including input of the URL, selection of a stored bookmark, and activation of a hyperlink, and wherein the step of capturing information comprises capturing the method used by the first user to access each of the documents in the sequence.

15. The method of claim 14, wherein the step of associating the plurality of content areas comprises dividing the sequence of documents used by the first user into a plurality of subsequences of documents where each subsequence comprises a first document in the subsequence accessed through the first user's selection of a bookmark or entry of a URL and one or more second documents following the first document in the subsequence accessed through activation of one or more hyperlinks.

16. The method of claim 15, wherein the plurality of different methods through which documents are accessible on the computer system by the first user through further include navigation to a document using navigational functions of a browser, and wherein the step of dividing the sequence of documents used by the first user into subsequences comprises including a document in a previously started subsequence when the document is accessed through the first user's navigation to the document using navigational finctions of the browser.

17. The method of claim 1, wherein the documents contain content, wherein the step of capturing information comprises capturing the content in the sequence of documents, and wherein the step of associating content areas comprises clustering documents in the sequence into sets based on the content in the documents.

18. The method of claim 17, wherein the documents are accessible on the computer system by the first user through a plurality of different methods, wherein the step of capturing information comprising capturing the method used by the first user to access each of the documents in the sequence, and wherein the step of clustering documents in the sequence comprises clustering documents into sets based on the content in the documents and the method used to access each document.

19. The method of claim 1, comprising:
  capturing information regarding a sequence of documents used by each of plurality of first users on the computer system;
  associating each sequence of documents with one of the first users; and
  associating a plurality of content areas with a plurality of sets of documents in each of the sequence of documents based on the captured information, thereby associating a plurality of content areas with each of the first users.

20. The method of claim 19, comprising allowing the second user to select one of the plurality of first users and allowing the second user to select a content area from the plurality of content areas associated with the selected first user.

21. The method of claim 19, comprising presenting to the second user a list containing the one or more first users associated with a content area selected by the second user.

22. The method of claim 21, comprising allowing the second user to select one of the first users from the list of first users associated with the selected content area.

23. The method of claim 19, wherein the plurality of first users ore organized in a plurality of groups, comprising allowing the second user to select one of the plurality of first user groups and allowing the second user to select a content area associated with one or more of the first users in the selected first user group.

24. A method for conveying expertise of a plurality of first users of a computer system to one or more second users of the computer system, the computer system storing a plurality of documents usable by the first and second users, the method comprising:
  capturing information regarding a sequence of documents used by each of the first users on the computer system;
  storing the captured information regarding each sequence of documents in association with the first user;
  allowing a second user to select one of the first users; and
  providing the sequence of documents associated with a selected first user to the second user.

25. A system for conveying expertise of a first user to one or more second users, wherein a plurality of documents are accessible for use by the first and second users, the method comprising:
  a logger for capturing information regarding a sequence of documents used by the first user on the computer system;
  a parser for associating a plurality of content areas with a plurality of sets of documents in the sequence of documents used by the first user based on the captured information;

means for accepting a selection by a second user of one of the content areas; and means for providing the set of documents associated with a selected content area to the second user.

26. A computer readable medium storing one or more software programs which, when executed, cause a computer to perform a method for conveying expertise of a first user of a computer system to one or more second users of the computer system, the computer system storing a plurality of documents usable by the first and second users, the method comprising:

capturing information regarding a sequence of documents used by the first user on the computer system;

associating a plurality of content areas with a plurality of sets of documents in the sequence of documents used by the first user based on the captured information;

allowing a second user of the computer system to select one of the content areas; and providing the set of documents associated with a selected content area to the second user.

27. The computer readable medium of claim 26, wherein the documents are each associated with an identifier, and wherein the step caused to be performed by the one or more software programs of capturing information comprises capturing the identifiers associated with the documents used.

28. The computer readable medium of claim 26, wherein the documents contain content and the step caused to be performed by the one or more software programs of capturing information comprises capturing the content contained in the documents.

29. The computer readable medium of claim 26, wherein the documents are accessible on the computer system by the first user through a plurality of different methods, and wherein the step caused to be performed by the one or more software programs of capturing information comprising capturing the method used by the first user to access each of the documents in the sequence.

30. The computer readable medium of claim 26, wherein the step caused to be performed by the one or more software programs of associating the plurality of content areas comprises dividing the sequence of documents used by the first user into a plurality of subsequences of documents based on the captured information and associating a content area with each of the subsequences of documents.

31. The computer readable medium of claim 30, wherein the step caused to be performed by the one or more software programs of associating the plurality of content areas comprises identifying a content area to associate with each subsequence based on the captured information.

32. The computer readable medium of claim 26, wherein the step caused to be performed by the one or more software programs of allowing the second user to select one of the content areas comprises presenting the plurality of content areas to the user as a plurality of selectable choices.

33. The computer readable medium of claim 26, wherein the step caused to be performed by the one or more software programs of allowing the second user to select one of the content areas comprises accepting a query from the second user about a desired subject and matching the queried subject with one of the plurality of content areas.

34. The computer readable medium of claim 26, wherein the step caused to be performed by the one or more software programs of providing the set of documents associated with the selected content area to the second user comprises providing the documents in the set in the sequence in which the documents in the set were used by the first user.

35. The computer readable medium of claim 26, wherein the computer system includes one or more servers storing the plurality of documents and one or more clients used by the first and second users, and wherein the step caused to be performed by the one or more software programs of capturing information regarding the sequence of documents used by the first user comprises monitoring the first user's use of the sequence of documents on a first client, transmitting information about the monitored use of the documents to a first server, and storing the transmitted information on the first server.

36. The computer readable medium of claim 35, wherein the first server executes the one or more software programs which caused to be performed the steps of associating the content areas with the sets of documents of providing the set of documents to the second user in response to the selection of the content area by the second user using a second client.

37. The computer readable medium of claim 35, wherein the computer system comprises a distributed computing environment in which documents are contained in one or more databases stored on the one or more servers, wherein each of the documents is identified by database location data, and wherein the step caused to be performed by the one or more software programs of transmitting information about the monitored use of the documents comprises transmitting the database location data identifying the documents.

38. The computer readable medium of claim 35, wherein the computer system comprises at least part of the world wide web in which documents stored on one or more web servers are each identified by a URL, and wherein the step caused to be performed by the one or more software programs of transmitting information about the monitored use of the documents comprises transmitting the URLs identifying the documents.

39. The computer readable medium of claim 38, wherein the documents are accessible on the computer system by the first user through a plurality of different methods including input of the URL, selection of a stored bookmark, and activation of a hyperlink, and wherein the step caused to be performed by the one or more software programs of capturing information comprises capturing the method used by the first user to access each of the documents in the sequence.

40. The computer readable medium of claim 39, wherein the step caused to be performed by the one or more software programs of associating the plurality of content areas comprises dividing the sequence of documents used by the first user into a plurality of subsequences of documents where each subsequence comprises a first document in the subsequence accessed through the first user's selection of a bookmark or entry of a URL and one or more second documents following the first document in the subsequence accessed through activation of one or more hyperlinks.

41. The computer readable medium of claim 40, wherein the plurality of different methods through which documents are accessible on the computer system by the first user through further include navigation to a document using navigational functions of a browser, and wherein the step caused to be performed by the one or more software programs of dividing the sequence of documents used by the first user into subsequences comprises including a document in a previously started subsequence when the document is accessed through the first user's navigation to the document using navigational functions of the browser.

42. The computer readable medium of claim 26, wherein the documents contain content, wherein the step caused to be performed by the one or more software programs of capturing information comprises capturing the content in the sequence of documents, and wherein the step caused to be performed by the one or more software programs of associating content areas comprises clustering documents in the sequence into sets based on the content in the documents.

43. The computer readable medium of claim 42, wherein the documents are accessible on the computer system by the first user through a plurality of different methods, wherein the step caused to be performed by the one or more software programs of capturing information comprising capturing the method used by the first user to access each of the documents in the sequence, and wherein the step caused to be performed by the one or more software programs of clustering documents in the sequence comprises clustering documents into sets based on the content in the documents and the method used to access each document.

44. The computer readable medium of claim 26, wherein the one or more software programs cause the computer to execute additional steps comprising:

capturing information regarding a sequence of documents used by each of plurality of first users on the computer system;

associating each sequence of documents with one of the first users; and associating a plurality of content areas with a plurality of sets of documents in each of the sequence of documents based on the captured information, thereby associating a plurality of content areas with each of the first users.

45. The computer readable medium of claim 44, wherein the one or more software programs cause the computer to allow the second user to select one of the plurality of first users and allow the second user to select a content area from the plurality of content areas associated with the selected first user.

46. The computer readable medium of claim 44, wherein the one or more software programs cause the computer to present to the second user a list containing the one or more first users associated with a content area selected by the second user.

47. The computer readable medium of claim 46, wherein the one or more software programs cause the computer to allow the second user to select one of the first users from the list of first users associated with the selected content area.

48. The computer readable medium of claim 46, wherein the plurality of first users are organized in a plurality of groups, wherein the one or more software programs cause the computer to allow the second user to select one of the plurality of first user groups and allow the second user to select a content area associated with one or more of the first users in the selected first user group.

49. A computer readable medium storing one or more software programs which, when executed, cause a computer to perform a method for conveying expertise of a plurality of first users of a computer system to one or more second users of the computer system, the computer system storing a plurality of documents usable by the first and second users, the method comprising:

capturing information regarding a sequence of documents used by each of the first users on the computer system;

storing the captured information regarding each sequence of documents in association with the first user;

allowing a second user to select one of the first users; and providing the sequence of documents associated with a selected first user to the second user.

\* \* \* \* \*

UNITED STATES PATENT AND TRADEMARK OFFICE
CERTIFICATE OF CORRECTION

PATENT NO. : 6,377,983 B1 Page 1 of 1
DATED : April 23, 2002
INVENTOR(S) : Andrew L. Cohen et al.

It is certified that error appears in the above-identified patent and that said Letters Patent is hereby corrected as shown below:

<u>Title page, Item [54] and Column 1, line 1,</u>
Replace "CONVERTING" with -- CONVEYING --.

Signed and Sealed this

Ninth Day of September, 2003

JAMES E. ROGAN
*Director of the United States Patent and Trademark Office*